(12) United States Patent
Peiffer et al.

(10) Patent No.: US 6,358,604 B1
(45) Date of Patent: Mar. 19, 2002

(54) MATTE, COEXTRUDED POLYESTER FILM, ITS USE AND PROCESS FOR ITS PRODUCTION

(75) Inventors: Herbert Peiffer, Mainz; Richard Lee Davis, Wiesbaden; Gottfried Hilkert, Saulheim, all of (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 09/361,603

(22) Filed: Jul. 26, 1999

(30) Foreign Application Priority Data

Jul. 31, 1998 (DE) .......................... 198 34 603

(51) Int. Cl.$^7$ .......................... B32B 27/08; B32B 27/30; B32B 27/36; B32B 27/40
(52) U.S. Cl. .................... 428/336; 428/423.7; 428/430; 428/446; 428/458; 428/480; 428/483; 428/910; 525/437
(58) Field of Search .................. 428/480, 483, 428/355 R, 213, 214, 910, 215, 216, 423.7, 430, 446, 458, 332, 336; 525/437

(56) References Cited

U.S. PATENT DOCUMENTS

| | | |
|---|---|---|
| 3,515,626 A | 6/1970 | Duffield |
| 3,958,064 A | 5/1976 | Brekken et al. |
| 4,042,569 A | 8/1977 | Bell et al. |
| 4,252,885 A | 2/1981 | McGrail et al. |
| 4,399,179 A | 8/1983 | Minami et al. |

(List continued on next page.)

FOREIGN PATENT DOCUMENTS

| | | |
|---|---|---|
| EP | 0 035 835 | 9/1981 |
| EP | 0 061 769 | 10/1982 |
| EP | 0 088 635 | 9/1983 |
| EP | 0 124 291 | 11/1984 |
| EP | 0 135 451 | 3/1985 |
| EP | 0 144 878 | 6/1985 |
| EP | 0 236 945 | 9/1987 |
| EP | 0 296 620 | 12/1988 |
| EP | 0 347 646 | 12/1989 |
| EP | 0 378 154 | 7/1990 |
| EP | 0 378 955 | 7/1990 |
| EP | 0 402 861 | 12/1990 |
| EP | 0 490 665 | 6/1992 |
| EP | 0 502 745 | 9/1992 |
| EP | 0 514 129 | 11/1992 |
| EP | 0 515 096 | 11/1992 |
| EP | 0 580 404 | 1/1994 |
| EP | 0 602 964 | 6/1994 |
| EP | 0 604 057 | 6/1994 |
| EP | 0 609 060 | 8/1994 |
| EP | 0 612 790 | 8/1994 |
| EP | 0 659 810 | 6/1995 |
| EP | 0 663 286 | 7/1995 |
| EP | 0 685 509 | 12/1995 |
| EP | 0 707 979 | 4/1996 |
| EP | 0 826 478 | 3/1998 |
| FR | 0 878 298 | 11/1998 |
| GB | 1096064 | * 12/1967 |
| WO | WO 94/13476 | 6/1994 |
| WO | WO 94/13481 | 6/1994 |
| WO | WO 98/13414 | 4/1998 |
| WO | WO 98/13415 | 4/1998 |
| WO | WO 88/10188 | 12/1998 |

OTHER PUBLICATIONS

Kimura, F. et al., FTIR Spectroscopic Study on Crystallization Process of Poly (ethylene–2,6–naphthalate), 35 Journal of Polymer Science: Polymer Physics 2741–2747 (1997).

Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/199818 (1998).

Database WPI, Section Ch, Week 9615, Derwent Publications Ltd., London, GB; Class A23, AN 96–148338, XP002114377 & JP 08036739 A (Toray Indus., Inc.) (Feb. 6, 1996).

Database WPI, Section Ch, Week 9522, Derwent Publications Ltd., London, GB; Class A32, AN 95–166886, XP002114408 & JP 07 088952 A (Toray Indus., Inc.) (Apr. 4, 1995).

Weiss, J., *Parameters that influence the barrier properties of metallized polyester and polypropylene films*, 204 Thin Solid Films 203–216 (1991).

Schmitz, Peter et al., "Films." Ullmann's Encyclopedia of Industrial Chemistry, 5th Ed., vol. A11. pp. 85–110, Jan. 1988.*

*Primary Examiner*—Vivian Chen
(74) *Attorney, Agent, or Firm*—Finnegan, Henderson, Farabow, Garrett & Dunner L.L.P.

(57) ABSTRACT

The invention relates to a biaxially oriented polyester film with a base layer at least 80% by weight of which is composed of a thermoplastic polyester, and with at least one matte outer layer which comprises a mixture or a blend of two components I and II wherein components I and II render the at least one outer layer matte. The invention further relates to the methods for use of the film and to a process for its production. Component I of the mixture or of the blend is a polyethylene terephthalate homopolymer or polyethylene terephthalate copolymer or a mixture of homo- or copolymers. Component II of the mixture or of the blend is a polyethylene terephthalate copolymer which is composed of the condensation product of the following monomers and/or of their derivatives capable of forming polyesters: isophthalic acid, aliphatic dicarboxylic acid, sulfomonomers and aliphatic or cycloaliphatic glycols. The outer layer according to the invention has a characteristic matte surface and/or appearance and is highly suitable for use as a packaging film, specifically for packaging foods and other consumable items, and for laminating, metallizing and printing, or for applications in the industrial sector.

20 Claims, No Drawings

U.S. PATENT DOCUMENTS

| | | |
|---|---|---|
| 4,493,872 A | 1/1985 | Funderburk et al. |
| 4,615,939 A | 10/1986 | Corsi et al. |
| 4,622,237 A | 11/1986 | Lori |
| 4,868,051 A * | 9/1989 | Grosjean .................... 428/336 |
| 4,883,706 A * | 11/1989 | Grosjean .................... 428/215 |
| 5,073,435 A * | 12/1991 | Eyraud et al. ............... 428/215 |
| 5,236,680 A | 8/1993 | Nakazawa et al. |
| 5,236,683 A | 8/1993 | Nakazawa et al. |
| 5,242,757 A | 9/1993 | Buisine et al. |
| 5,429,785 A | 7/1995 | Jolliffe |
| 5,453,260 A | 9/1995 | Nakazawa et al. |
| 5,468,527 A | 11/1995 | Peiffer et al. |
| 5,506,014 A | 4/1996 | Minnick |

* cited by examiner

MATTE, COEXTRUDED POLYESTER FILM, ITS USE AND PROCESS FOR ITS PRODUCTION

The invention relates to a biaxially oriented polyester film with a base layer at least 80% by weight of which is composed of a thermoplastic polyester, and with at least one matte outer layer which comprises a mixture or a blend of two components I and II. The invention further relates to the use of the film and to a process for its production.

Component I of the mixture or of the blend is a polyethylene terephthalate homopolymer or polyethylene terephthalate copolymer or a mixture of polyethylene terephthalate homo- or copolymers.

Component II of the mixture or of the blend is a polyethylene isophthalate copolymer which is composed of the condensation product of the following monomers and/or of their derivatives capable of forming polyesters: isophthalic acid, aliphatic dicarboxylic acid, sulfomonomers which comprise a metal sulfonate group on the aromatic moiety of an aromatic dicarboxylic acid, and aliphatic or cycloaliphatic glycol.

The outer layer according to the invention has a characteristic matte surface and/or appearance and is highly suitable for use as a packaging film or for applications in the industrial sector.

BACKGROUND OF THE INVENTION

The packaging industry has a high requirement for transparent, high-gloss plastic films, such as biaxially oriented polypropylene films or biaxially oriented polyester films. There is also an increasing requirement for transparent films of this type with at least one surface layer which is not high-gloss but has a characteristically matte appearance and thus gives, for example, the packaging an appearance which is particularly attractive and therefore effective for sales promotion.

EP 346 647 describes a biaxially oriented polyester film which comprises at least one outer layer having a concentration of from 0.05 to 50% of a filler, where the diameter of this filler is in a particular ratio to the thickness of the outer layer. The outer layer moreover has a particular thickness and a particular degree of crystallinity, determined with the aid of Raman spectroscopy.

U.S. Pat. No. 4,399,179 describes a coextruded biaxially oriented polyester film which is composed of a transparent base layer and of at least one matte layer consisting essentially of a particular polyethylene terephthalate copolymer and also comprising a concentration of from 3 to 40% of inert particles with a diameter of from 0.3 to 20 μm. The specific copolymer is a processing aid which reduces the viscosity of the melt comprising the inert particles, allowing satisfactory extrusion of this layer. The matte quality of the film is achieved by adding the inert particles to the appropriate layer.

EP 0 144 878 describes a self-supporting oriented film which is composed of thermoplastic and at least one of the two surfaces of which carries a continuous polyester coating, which is applied in the form of an aqueous dispersion to the film before the final stretching step. The polyester coating is composed of a condensation product of various monomers or of their derivatives capable of forming polyesters, such as isophthalic acid, aliphatic dicarboxylic acid, sulfomonomers and aliphatic or cycloaliphatic glycols.

In the cases described there is no indication as to how the film can be made low-gloss on at least one of its surfaces while retaining high film transparency.

It is therefore an object of the present invention to provide a coextruded, biaxially oriented and transparent polyester film which has at least one matte outer layer, is simple and cost-effective to produce, has the good physical properties of the known films, and does not create disposal problems.

DESCRIPTION OF THE INVENTION

The object is achieved by means of a coextruded and biaxially oriented polyester film of the type described at the outset whose characterizing features are that the matte outer layer comprises a mixture or a blend of two components I and II.

Component I of the mixture or of the blend is a polyethylene terephthalate homopolymer or polyethylene terephthalate copolymer or a mixture of polyethylene terephthalate homo- or copolymers.

Component II of the copolymer or of the mixture or of the blend is a polyethylene isophthalate copolymer which is composed of the condensation product of the following monomers and/or of their derivatives capable of forming polyesters:

A) from 65 to 95 mol % of isophthalic acid;
B) from 0 to 30 mol % of at least one aliphatic dicarboxylic acid with the formula

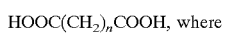

n is from 1 to 11;
C) from 5 to 15 mol % of at least one sulfomonomer comprising an alkali metal sulfonate group on the aromatic moiety of a dicarboxylic acid;
D) a copolymerizable aliphatic or cycloaliphatic glycol having from 2 to 11 carbon atoms, in the stoichiometric amount necessary to form 100 mol % of condensate;

where each of the percentages given is based on the total amount of the monomers forming component II.

For the purposes of the present invention, mixtures are mechanical mixtures produced from the individual components. For this, the individual constituents are generally combined in the form of small-dimension compressed moldings, e.g. lenticular or bead-shaped pellets, and mixed with one another using a suitable agitator. Another way of producing the mixture is for each of the components I and II in pellet form to be fed separately to the extruder for the outer layer according to the invention and for mixing to take place in the extruder and/or in the downstream systems for transporting the melt, For the purposes of the present invention a blend is an alloy-like composite of the individual components I and II which can no longer be separated into the initial constituents. A blend has properties like those of a homogeneous material and can therefore be characterized by appropriate parameters.

The subclaims give preferred embodiments of the invention, and these are also described below.

According to the invention the film has at least two layers. Its layers are then a layer B and the outer layer A according to the invention. In a preferred embodiment of the invention the film has a three-layer structure and has the outer layer A on one side of the layer B (=base layer) and another layer C on the other side of the layer B. In this case the two layers A and C form the outer layers A and C.

The base layer B of the film preferably comprises at least 90% by weight of a thermoplastic polyester. Polyesters suitable for this are those made from ethylene glycol and terephthalic acid (polyethylene terephthalate, PET), made from ethylene glycol and naphthalene-2,6-dicarboxylic acid (polyethylene 2,6-naphthalate, PEN), made from 1,4-bishydroxymethylcyclohexane and terephthalic acid [poly (1,4-cyclohexanedimethylene terephthalate), PCDT], and also those made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters composed of at least 90 mol %, preferably at least 95 mol %, of ethylene glycol units and terephthalic acid units or of ethylene glycol units and naphthalene-2,6-dicarboxylic acid units. The remaining monomer units derive from other aliphatic, cycloaliphatic or aromatic diols and, respectively, dicarboxylic acids, as may also be present in layer A (or layer C).

Examples of other suitable aliphatic diols are diethylene glycol, triethylene glycol and aliphatic glycols of the general formula HO—(CH$_2$)$_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention may be made of cyclohexanediols (in particular 1,4-cyclohexanediol). Other suitable aromatic diols have, for example, the formula HO—C$_6$H$_4$—X—C$_6$H$_4$—OH where X is —CH$_2$—,—C(CH$_3$)$_2$—, —C(CF$_3$)$_2$—, —O—, —S— or —SO$_2$—. Bisphenols of the formula HO—C$_6$H$_4$—C$_6$H$_4$—OH are also highly suitable.

Other preferred aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids, mention may be made of cyclohexane dicarboxylic acids (in particular cyclohexane-1,4-dicarboxylic acid). Particularly suitable aliphatic dicarboxylic acids are the C$_3$–C$_{19}$ alkanedicarboxylic acids, where the alkane moiety may be straight-chain or branched.

The polyesters may be prepared, for example, by the transesterification process. The starting materials for this are dicarboxylic esters and diols, and these are reacted with the usual transesterification catalysts, such as zinc salts, calcium salts, lithium salts, magnesium salts and manganese salts. The intermediates are then polycondensed in the presence of widely used polycondensation catalysts, such as antimony trioxide or titanium salts. The preparation may equally take place by the direct esterification process in the presence of polycondensation catalysts. This process starts directly from the dicarboxylic acids and diols.

At least one outer layer of the novel coextruded film comprises a mixture or a blend described in more detail below and made from two components I and II and, if desired, additives.

Component I of the outer layer mixture or of the blend comprises essentially a thermoplastic polyester, in particular a polyester of this type as described in more detail for the base layer. To produce a high degree of matte quality it has proven useful here for the polyester polymer for component I of the outer layer according to the invention to have per se comparatively low viscosity. To describe the viscosities of the melts a modified solution viscosity (SV) is used. For commercially available polyethylene terephthalates suitable for producing biaxially oriented films the SV is from 500 to 1200. To achieve high film matte quality for the purposes of the present invention it has proven useful for the SV of the polymers for component I of the outer layer according to the invention to be from 500 to 800, preferably from 500 to 750, particularly preferably from 500 to 700.

Component II of the outer layer mixture is prepared, as stated above, by polycondensing A) isophthalic acid, B) an aliphatic dicarboxylic acid of the formula HOOC(CH$_2$)$_n$COOH, where n is from 1 to 11, C) a sulfomonomer containing an alkali-metal-sulfonate group on the aromatic moiety of an aromatic dicarboxylic acid, and D) at least one aliphatic or cycloaliphatic alkylene glycol having from about 2 to 11 carbon atoms. The total molar equivalent amount of acid present should essentially correspond to the equivalent amounts of glycols present.

Examples of dicarboxylic acids suitable as component B) of the copolyesters are malonic, adipic, azelaic, glutaric, sebacic, suberic, succinic and brassylic acids, and also mixtures of these acids or their derivatives capable of forming polyesters. Among the acids mentioned preference is given to sebacic acid.

Examples of sulfomonomers (component C) which contain a metal-sulfonate group on the aromatic moiety of an aromatic dicarboxylic acid are monomers of the following general formula:

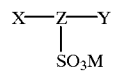

In this formula

M is a monovalent cation or an alkali metal,

Z is a trivalent aromatic radical, and

X and Y are carboxyl groups or polyester-forming equivalents.

Monomers of this type have been described in U.S. Pat. Nos. 3,563,942 and 3,779,993. Examples of such monomers are the sodium salts of sulfoterephthalic acid, 5-sulfoisophthalic acid, sulfophthalic acid, 5-(p-sulfophenoxy)isophthalic acid, 5-sulfopropoxyisophthalic acid and similar monomers, and also their derivatives, such as the dimethyl esters, capable of forming polyesters. M is preferably Na$^+$, Li$^+$ or K$^+$.

The term "derivatives capable of forming polyesters" here means reaction participants with groups capable of condensation reactions, in particular transesterification reactions, to form polyester bonds. Groups of this type include carboxyl groups and also the lower alkyl esters of these, e.g. dimethyl terephthalate, diethylterephthalate and numerous other esters, halides or salts. The acid monomers are preferably used in the form of dimethyl esters, since this gives better control of the condensation reaction.

Examples of glycols suitable as component B) are ethylene glycol, 1,5-pentanediol, 1,6-hexanediol, neopentyl glycol, 1,10-decanediol, cyclohexanedimethanol and similar substances. Preference is given to the use of ethylene glycol.

The copolyesters may be prepared by known polymerization techniques. The method is generally to combine the acid components with glycol and to apply heat in the presence of an esterification catalyst, and then to add a polycondensation catalyst.

The relative proportions of components A, B, C and D used to prepare the mixtures according to the invention have proven decisive for achieving the matte outer layer. For example, at least about 65 mol % of isophthalic acid (component A) must be present as acid component. Component A is preferably in the form of pure isophthalic acid, present in amounts of from about 70 to 95 mol %.

For component B, any acid with the formula mentioned gives satisfactory results, and preference is given to adipic acid, azelaic acid, sebacic acid, malonic acid, succinic acid, glutaric acid and mixtures of these acids. If component B is present in the composition the desirable amount within the range given is preferably from 1 to 20 mol %, based on the acid components of the mixture 1.

The amount of the glycol component present is approximately stoichiometric.

The copolyesters suitable for the purposes of the invention also have an acid number of less than 10, preferably of from 0 to 3, an average molecular weight of below about 50,000 and an SV of from about 30 to 700, preferably from about 350 to 650.

The ratio (weight ratio) of the two components I and II of the outer layer mixture or of the blend may vary within wide limits and depends on the application intended for the coextruded film. The ratio of components I and II is preferably from I:II=10:90 to I:II=95:5, preferably from I:II= 20:80 to I:II=95:5 and in particular from I:II=30:70 to I:II=95:5.

The base layer and the outer layer(s) may also comprise conventional additives, such as stabilizers and antiblocking agents. They are usefully added to the polymer or to the polymer mixture before melting. Examples of stabilizers used are phosphorus compounds, such as phosphoric acid or its esters. Typical antiblocking agents (also termed pigments in this context) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, alumina, LiF, the calcium, barium, zinc or manganese salts of the dicarboxylic acids used, carbon black, titanium dioxide, kaolin and crosslinked polystyrene particles or crosslinked acrylate particles.

Mixtures of two or more different antiblocking agents or mixtures of antiblocking agents of the same composition but different particle size may also be used as additives. The particles may be added to the individual layers in the usual concentrations, e.g. as a glycolic dispersion during the polycondensation or via master batches during extrusion. Pigment concentrations which have proven particularly suitable are from 0.0001 to 10% by weight. Adding these particles to the outer layer A according to the invention gives the further advantageous possibility of varying the degree of matte quality of the film. Increasing the pigment concentration is generally also associated with an increase in the degree of matte quality of the film. A detailed description of the antiblocking agents is found, for example, in EP-A 0 602 964.

The present invention also provides a process for producing this film. It encompasses
 a) producing a film from base and outer layer(s) by coextrusion,
 b) biaxial orientation of the film, and
 c) heat-setting of the oriented film.

To produce the outer layer according to the invention it is useful to feed pellets of mixing component I and pellets of mixing component II directly to the extruder in the desired mixing ratio. It has proven useful to use a twin-screw extruder for extruding the matte outer layer according to the invention, as described, for example, in EP 0 826 478. The two materials can be melted and extruded at about 300° C. and with a residence time of about 5 min. The transesterification reactions which can occur in the extruder under these conditions can form other copolymers from the homopolymers and the copolymers.

The polymers for the base layer are usually fed via another extruder. Any foreign bodies or contamination present can be filtered out from the polymer melt prior to extrusion. The melts are then extruded via a coextrusion die to give flat melt films and the layers are mutually superposed. The coextruded film is then drawn off and solidified with the aid of a chill roll and, if desired, of other rolls.

The biaxial orientation procedure is generally carried out in succession or simultaneously. For stretching in succession it is preferable for the first orientation to be longitudinal (i.e. in the machine direction) and for this to be followed by transverse orientation (i.e. perpendicularly to the machine direction). This causes orientation of the molecular chains. The longitudinal orientation process can be carried out with the aid of two rolls running at different speeds corresponding to the desired stretching ratio. For the transverse orientation process use is generally made of an appropriate tenter frame. For the simultaneous stretching process, the film is stretched simultaneously in longitudinal and transverse directions in a tenter frame.

The temperature at which the orientation process is carried out may vary over a relatively wide range and depends on the properties desired in the film. The longitudinal stretching process is generally carried out at from 80 to 130° C., and the transverse stretching process at from 90 to 150° C. The longitudinal stretching ratio is generally from 2.5:1 to 6:1, preferably from 3:1 to 5.5:1. The transverse stretching ratio is generally from 3.0:1 to 5.0:1, preferably from 3.5:1 to 4.5:1. If desired, the transverse stretching process may be followed by a further longitudinal orientation process and even a further transverse orientation process.

In the heat-setting process which follows, the film is held at a temperature of from 150 to 250° C. for from 0.1 to 10 s. The film is then wound up in a usual manner.

At least one of the surfaces of the film may, furthermore, be coated in such a way that the coating on the finished film has a thickness of from 5 to 100 nm, preferably from 20 to 70 nm, in particular from 30 to 50 nm. The coating is preferably applied in-line, i.e. during the film-production process, usefully prior to the transverse stretching process. A particularly preferred application method is reverse gravure-roll coating, which can apply extremely homogeneous coatings of the thicknesses mentioned. The coatings are preferably applied in the form of solutions, suspensions or dispersions, particularly preferably as aqueous solution, suspension or dispersion. The coatings mentioned give the film surface an additional function, for example render the film sealable, printable, metallizable, sterilizable or antistatic, or improve the aroma barrier, or allow adhesion to materials which would otherwise not adhere to the surface of the film (for example photographic emulsions). Examples of substances/compositions which give additional functionality are:

Acrylates, as described, for example, in WO 94/13476, ethylvinyl alcohols, PVDC, water glass ($Na_2SiO_4$), hydrophilic polyesters (PET/IPA polyesters as described, for example, in EP-A-0 144 878, US-A4,252,885 or EP-A-0 296 620 and containing the sodium salt of 5-sulfoisophthalic acid), vinyl acetates, as described, for example, in WO 94/13481, polyvinyl acetates, polyurethanes, the alkali-metal or alkaline-earth-metal salts of $C_{10}$–$C_{18}$ fatty acids, butadiene copolymers with acrylonitrile or methyl methacrylate, methacrylic acid, acrylic acid or esters thereof.

The substances/compositions mentioned are applied in the form of dilute solution, emulsion or dispersion, preferably aqueous solution, emulsion or dispersion to one or both surfaces of the film, and the solvent is then evaporated. If the coatings are applied in-line prior to the transverse stretching process, the heat-treatment during the transverse stretching process and the subsequent heat-setting is usually sufficient to evaporate the solvent and to dry the coating. The dried coatings then have the desired thicknesses mentioned above.

The films may, furthermore, be coated, preferably in an off-line process using metals, such as aluminum, or ceramic materials, such as $SiO_x$ or $Al_xO_y$. This improves in particular their gas-barrier properties.

The novel polyester film preferably also comprises a second outer layer C. The structure, thickness and composition of a second outer layer may be selected independently of the outer layer already present. The second outer layer may also comprise the abovementioned polymers or polymer mixtures for the base layer or the first outer layer according to the invention, but these do not have to be identical with those of the first outer layer. The second outer layer may also comprise other common outer layer polymers.

Between the base layer and the outer layer(s) there may also, if desired, be an intermediate layer. It may be composed of the polymers described for the base layers. In a particularly preferred embodiment it is composed of the polyester used for the base layer. It may also comprise the conventional additives described. The thickness of the intermediate layer is generally, greater than 0.3 μm and is preferably from 0.5 to 15 μm, in particular from 1.0 to 10 μm.

The thickness of the outer layer(s) is generally greater than 0.1 μm, preferably from 0.2 to 6 μm or form 0.2 to 5 μm In summary, the novel film has low gloss, in particular low gloss on film surface A, and relatively low haze. It also has good winding and processing performance. The good inscribability of the outer layer according to the invention with ballpoint pens, felt-tips or fountain pens is also worthy of mention.

The gloss of film side A is lower than 70. In a preferred embodiment the gloss of this side is lower than 60, and in a particularly preferred embodiment it is lower than 50. The nature of this surface of the film is therefore particularly effective for sales promotion and it therefore has very particular suitability as the outward-facing surface of packaging.

The haze of the film is less than 40%. In a preferred embodiment it is less than 35%, and in a particularly preferred embodiment it is less than 30%. The comparatively low haze of the film (compared with a matte monofilm, see comparative example) means that the film can, for example, be reverse-printed, or viewing windows can be incorporated through which, for example, the contents can be clearly discerned.

Other application sectors are the production of labels, release film for producing glass-fiber-reinforced semifinished products, hot-stamping foils and in-mold labeling.

The table below (Table 1) once again gives the most important properties of the films according to the invention.

TABLE 1

| | Range according to the invention | Preferred | Particularly preferred | Unit | Method of measurement |
|---|---|---|---|---|---|
| Gloss of side A (60° angle of measurement) | <70 | <60 | <50 | | DIN 67 530 |
| Haze | <40 | <35 | <30 | % | ASTM-D 1003-52 |
| Coefficient of friction: | | | | | DIN 53 375 |
| Side A with respect to itself | <0.6 | <0.55 | <0.50 | | |
| Side C and, respectively, side B with respect to itself | <0.5 | <0.55 | <0.55 | | |
| Average roughness $R_a$ Side A | 200–600 | 230–550 | 250–530 | nm | DIN 4768 with a cut-off of 0.25 nm | and preferably from 0.3 to 5.5 μm, in particular preferably from 0.3 to 5.0 μm, and further preferred from 0.2 to 4 μm, and the outer layers may have identical or different thicknesses.

The overall thickness of the novel polyester film may vary within wide limits and depends on the application intended. It is preferably from 4 to 300 μm, in particular from 5 to 250 μm, particularly preferably from 6 to 200 μm, and the base layer preferably makes up a proportion of from about 40 to 90% of the overall thickness.

Another advantage is that the costs of producing the novel film are not significantly greater than those for a film made from standard polyester raw materials. The other properties of the novel film relevant to its processing and use remain essentially unchanged or are even improved. In addition, it has been ensured that a proportion of up to 50% by weight, preferably from 10 to 50% by weight of recycled material, based in each case on the total weight of the film, can be reused in producing the film, without any significant adverse effect on its physical properties.

The film has excellent suitability for packaging food and other consumable items which, in both these cases, are sensitive to light and/or to air. Specifically, it is suitable for producing packaging for coffee, in particular ground coffee.

The following methods were used to characterize the raw materials and the films:

To determine SV (solution viscosity) a specimen of polyester was dissolved (1% strength by weight solution) in a solvent (dichloroacetic acid). The viscosity of the solution and that of the pure solvent were measured in an Ubbelohde viscometer. The two values were used to calculate the quotient (relative viscosity $n_{rel}$), 1.000 was subtracted from this value and the result multiplied by 1000, to give the SV.

The coefficient of friction was determined in accordance with DIN 53 375.

The coefficient of sliding friction was measured 14 days after production.

Surface tension was measured by the ink method (DIN 53 364).

The haze of the film was measured to ASTM-D 1003-52. The Hölz haze was determined by a method based on ASTM-D 1003-52, but in order to utilize the most effective measurement range, measurements were made on 4 pieces of film laid one on top of the other, and a 1° slit diaphragm was used instead of a 40 pinhole.

Gloss was determined to DIN 67 530. The reflectance was measured as an optical value characteristic of a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

The roughness $R_a$ of the film was determined to DIN 4768 with a cut-off of 0.25 nm.

The following examples illustrate the invention.

EXAMPLE 1 a) Preparation of Component II for the Outer Layer Mixture According to the Invention A copolyester with about 90 mol % of isophthalic acid and 10 mol % of the sodium salt of 5-sulfoisophthalic acid as acid component and 100 mol % of ethylene glycol component was prepared by the following method:

A stainless-steel reaction vessel of 2/capacity, equipped with an anchor stirrer, a thermal element for measuring the temperature of the vessel contents, an 18-inch Claisen/Vigreux distillation column with condenser and receiving vessel, an inlet opening and a heating jacket, was preheated to 190° C. and flushed with nitrogen. 1065.6 g of dimethyl isophthalate, 180.6 g of the sodium salt of dimethyl 5-sulfoisophthalate and 756.9 g of ethylene glycol were placed in the vessel. A buffer ($Na_2CO_3$ $10H_2O$-0.439 g) and a transesterification catalyst ($Mn(OAc)_2.4H_2O$-0.563 g) were also placed in the vessel. The mixture was heated with stirring, whereupon methanol distilled off. During the distillation the temperature in the vessel was gradually increased to 250° C. When the distillate weight corresponded to the theoretical methanol yield, an ethylene glycol solution comprising 0.188 g of phosphorous acid was added. The distillation column was replaced by a curved vapor take-off with receiving vessel. 20 g of pure ethylene carbonate were added to the reaction mixture, whereupon vigorous evolution of gas ($CO_2$) began immediately. $CO_2$ evolution subsided after about 10 min. A reduced pressure of 240 mm of Hg was then applied, and the polycondensation catalyst (0.563 g of $Sb_2O_3$ slurried in ethylene glycol) was added. The reaction mixture was stirred for 10 min while maintaining the reduced pressure of 240 mm of Hg after which the pressure was further reduced from 240 to 20 mm of Hg in steps of 10 mm of Hg/min. As soon as the pressure in the system had been reduced to 20 mm of Hg, the temperature in the vessel was raised from 250° C. to 290° C. at a rate of 2° C./min. When the temperature in the vessel had reached 290° C. the stirrer speed was throttled back and the pressure reduced to not more than 0.1 mm of Hg. At this juncture a read-out was obtained from the stirrer motor using an ammeter. The viscosity of the polymer was controlled by allowing the polycondensation to proceed in accordance with set values for the change in the ampere value from the stirrer motor of (in each case) 2.3 A. When the desired molecular weight had been achieved, nitrogen pressure was applied to the vessel to expel the liquid polymer from the outlet in the base of the vessel into an ice-water quenching bath.

B) Preparation of the Mixture for Outer Layer A According to the Invention

80% by weight of component I (polyethylene terephthalate with SV of 680) was fed with 20% by weight of component II to the inlet hopper of a twin-screw extruder and the two components were extruded together at about 300° C. and fed to the outer layer channel A of a coextrusion die.

At the same time, polyethylene terephthalate chips were dried at 160° C. to a residual moisture of less than 50 ppm and fed to the extruder for the base layer. Chips of polyethylene terephthalate with a filler were also fed to the extruder for the outer layer C. Coextrusion followed by stepwise longitudinal and transverse orientation was then used to produce a transparent three-layer film with ABC structure and an overall thickness of 12 µm. The thickness of each outer layer was 1.5 µm.

Base layer B:

| | |
|---|---|
| 95% by weight | of polyethylene terephthalate (RT 49 from Hoechst AG) with SV of 800, and |
| 5% by weight | of master batch made from 99% by weight of polyethylene terephthalate and 1.0% by weight of silica particles (® Sylobloc 44 H from Grace) with an average particle size of 4.5 µm. |

Outer layer A:

| | |
|---|---|
| 80% by weight | of component I, and |
| 20% by weight | of component II. |

Outer layer C:

| | |
|---|---|
| 90% by weight | of polyethylene terephthalate (RT 49 from Hoechst AG) with SV of 800, and |
| 10% by weight | of master batch made from 99% by weight of polyethylene terephthalate and 1.0% by weight of silica particles (® Sylobloc 44 H from Grace) with an average particle size of 4.5 µm. |

The individual steps were:

| | | | |
|---|---|---|---|
| Extrusion | Temperatures: | Outer layer: | 300° C. |
| | | Base layer: | 300° C. |
| | Temperature of the take-off roll: | | 30° C. |
| | Die width: | | 1 mm |
| Longitudinal stretching | Temperature: | | 85–135° C. |
| | Longitudinal stretching ratio: | | 4.0:1 |
| Transverse stretching | Temperature: | | 85–135° C. |
| | Transverse stretching ratio: | | 4.0:1 |
| Setting | Temperature: | | 230° C. |

EXAMPLE 2

As in Example 1, coextrusion was used to produce a three-layer film with an overall thickness of 12 µm. Only the composition of outer layer A was changed:

Outer layer A:

| | |
|---|---|
| 75% by weight | of component I, and |
| 25% by weight | of component II. |

EXAMPLE 3

A coextruded film was formulated as in Example 1 but the composition of outer layer A was:

| 70% by weight | of component I, and |
| 30% by weight | of component II. |

EXAMPLE 4

A coextruded film was formulated as in Example 1 but the composition of outer layer A was:

| 60% by weight | of component I, and |
| 40% by weight | of component II. |

COMPARATIVE EXAMPLE

A monofilm was produced with the composition of outer layer A from Example 3. The surfaces of the film had the required matte quality, but the film did not meet the requirements set because its haze was too high. In addition, it was very difficult to produce the film reliably and therefore cost-effectively.

The table below (table 2) gives a summary of the properties of examples 1–4 and the comparative example.

TABLE 2

| Example No. | Mixing ratio I:II in outer layer A | Film thickness ($\mu$m) | Outer layer thickness A/C ($\mu$m) | Film structure | Gloss (60° angle of measurement) | | Haze |
|---|---|---|---|---|---|---|---|
| | | | | | Side A | Side C | |
| 1 | 80:20 | 12 | 1.5/1.5 | ABC | 65 | 175 | 25 |
| 2 | 75:25 | 12 | 1.5/1.5 | ABC | 55 | 175 | 26 |
| 3 | 70:30 | 12 | 1.5/1.5 | ABC | 45 | 175 | 28 |
| 4 | 60:40 | 12 | 1.5/1.5 | ABC | 35 | 175 | 30 |
| CE | 70:30 | 12 | | A | 35 | 160 | 70 |

What is claimed is:

1. A polyester film comprising:
   (A) a base layer at least 80% by weight of which is composed of a thermoplastic polyester, and
   (B) at least one matte outer layer, wherein the outer layer is composed of a mixture or a blend of two components I and II, wherein components I and II render the at least one outer layer a matte layer and,
   wherein component I of the mixture or of the blend comprises a polyethylene terephthalate homopolymer or polyethylene terephthalate copolymer or a mixture of homo or copolymers, and
   wherein component II of the mixture or of the blend consisting essentially of the condensation product of the following monomers and/or of their derivatives capable of forming polyesters:
   (i) from 65 to 95 mol % of isophthalic acid;
   (ii) from 0 to 30 mol % of at least one aliphatic dicarboxylic acid with the formula

where
   n is from 1 to 11;
   (iii) from 5 to 15 mol % of at least one sulfomonomer comprising an alkali metal sulfonate group on the aromatic moiety of a dicarboxylic acid;
   (iv) a copolymerizable aliphatic or cycloaliphatic glycol having from 2 to 11 carbon atoms, in the stoichiometric amount necessary to form 100 mol % of condensate;
   where each of the percentages given is based on the total amount of the monomers forming the polyester coating.

2. A film as claimed in claim 1, wherein the mixing ratio of components I and II is from I:II=10:90 to I:II=95:5.

3. A film as claimed in claim 1, wherein the mixing ratio of components I and II is from I:II=20:80 to I:II=95:5.

4. A film as claimed in claim 1, wherein the mixing ratio of components I and I and II is from I:II=30:70 to I:II=95:5.

5. A film as claimed in claim 1, wherein the thickness of the outer layer is from 0.2 to 6 $\mu$m.

6. A film as claimed in claim 1, wherein the thickness of the outer layer is from 0.3 to 5.5 $\mu$m.

7. A film as claimed in claim 1, wherein the thickness of the outer layer is from 0.3 to 5.0 $\mu$m.

8. A film as claimed in claim 1, which has two layers and is composed of the base layer and the outer layer.

9. A film as claimed in claim 1, which has three layers and is composed of the base layer and of an outer layer on each side of the base layer.

10. A film as claimed in claim 1, wherein outer layer A has been pigmented with a concentration of up to 10% of inorganic filler, or organic filler, or a mixture thereof.

11. A film as claimed in claim 1, at least one surface of which has been metallized or has been coated with $SiO_x$, $Al_xO_y$, ethylvinyl alcohol, PVDC, water glass, hydrophilic polyester, vinyl acetate, polyvinyl acetate, polyurethane, alkali-metal or alkaline-earth-metal salts of fatty acids, butadiene copolymer, (meth)acryhic acid or its esters, or silicone.

12. A process for producing a polyester film as claimed in claim 1, which comprises:
   (A) coextruding a film from a base layer and one or more outer layers;
   (B) orienting the film biaxially; and
   (C) heat-setting the oriented film.

13. A method for packaging foods and other consumable items, comprising applying an effective amount of a film as claimed in claim 1 to a food or other consumable item.

14. A method for making laminatable film, which comprises preparing said lamentable film with a film as claimed in claim 1.

15. A method for making metallizable film, which comprises preparing said metallizable film with a film as claimed in claim 1.

16. A method for making printable film, which comprises preparing said printable film with a film as claimed in claim 1.

17. A method for making a label, which comprises preparing said label with a film as claimed in claim 1.

18. A method for making a release film for producing glass-fiber-reinforced semifinished products, which comprises preparing said release film for producing glass-fiberreinforced semifinished products with a film as claimed in claim 1.

19. A method for making hot-stamping foil, which comprises preparing said hot-stamping foil with a film as claimed in claim 1.

20. A method for making an in-mold label, which comprises preparing said in-mold label with a film as claimed in claim 1.

* * * * *

UNITED STATES PATENT AND TRADEMARK OFFICE
CERTIFICATE OF CORRECTION

PATENT NO. : 6,358,604 B1
DATED : March 19, 2002
INVENTOR(S) : Peiffer et al.

It is certified that error appears in the above-identified patent and that said Letters Patent is hereby corrected as shown below:

Column 11,
Line 53, "homo" should read -- homo- --.
Line 55, "consisting essentially" should read -- consists essentially --.

Column 12,
Line 12, "I and" (second occurrence) should be deleted.
Line 44, "(meth)acryhic" should read -- (meth)acrylic --.
Line 56, "lamentable" should read -- laminatable --.

Signed and Sealed this

Tenth Day of September, 2002

Attest:

JAMES E. ROGAN
*Attesting Officer*  *Director of the United States Patent and Trademark Office*